(12) United States Patent
Dittmer et al.

(10) Patent No.: US 9,370,053 B2
(45) Date of Patent: Jun. 14, 2016

(54) METHOD FOR CONTROLLING A MELT PROCESS IN AN ARC FURNACE AND SIGNAL PROCESSING COMPONENT, PROGRAM CODE AND DATA MEDIUM FOR PERFORMING SAID METHOD

(75) Inventors: Björn Dittmer, Bardowick (DE); Arno Döbbeler, Herzogenaurach (DE); Klaus Krüger, Hamburg (DE); Sascha Leadbetter, München (DE); Thomas Matschullat, Eckental (DE); Detlef Rieger, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 965 days.

(21) Appl. No.: 13/498,760

(22) PCT Filed: Sep. 14, 2010

(86) PCT No.: PCT/EP2010/063459
§ 371 (c)(1),
(2), (4) Date: Mar. 28, 2012

(87) PCT Pub. No.: WO2011/036071
PCT Pub. Date: Mar. 31, 2011

(65) Prior Publication Data
US 2012/0183010 A1    Jul. 19, 2012

(30) Foreign Application Priority Data

Sep. 28, 2009 (DE) .......... 10 2009 048 660
Nov. 2, 2009 (DE) .......... 10 2009 053 169

(51) Int. Cl.
*H05B 7/148* (2006.01)
*C21C 5/52* (2006.01)
(Continued)

(52) U.S. Cl.
CPC .............. *H05B 7/148* (2013.01); *C21C 5/5211* (2013.01); *F27B 3/28* (2013.01); *F27D 19/00* (2013.01);
(Continued)

(58) Field of Classification Search
CPC .................. C21C 2005/5288; C21C 2300/06; C21C 5/5211; F27B 3/28; F27D 19/00; F27D 21/00; H05B 7/148
USPC ....................... 373/2, 100–105, 108
See application file for complete search history.

(56) References Cited

U.S. PATENT DOCUMENTS

| 2002/0001332 A1* | 1/2002 | Shver ............................. 373/66 |
| 2008/0198894 A1 | 8/2008 | Matschullat .................. 373/104 |

(Continued)

FOREIGN PATENT DOCUMENTS

| CN | 101228284 A | 7/2008 | ................ C21C 5/52 |
| DE | 2615202 A1 | 10/1977 | ............. H05B 7/148 |

(Continued)

OTHER PUBLICATIONS

Chinese Office Action, Application No. 2010800431642, 11 pages, Jul. 19, 2013.

(Continued)

*Primary Examiner* — Dana Ross
*Assistant Examiner* — James Sims, III
(74) *Attorney, Agent, or Firm* — Slayden Grubert Beard PLLC

(57) ABSTRACT

A method for controlling a melt process in an arc furnace, including a signal processing component, program code, and data medium for performing the method. Sound signals or vibrations from the interior of the furnace container are captured by solid-borne sound sensors, from which characteristic values can be derived representing the distribution of melting material, melt, and slag in the furnace fill. A characteristic values are generated in priority sequence for: thermal radiation impinging on the furnace wall of the container, the lumpiness of the melting material in the volume of furnace fill, and the change to the portion of solid melting material contacting the furnace wall. The energy distribution at the electrodes is chanced by a control system based on the characteristic values in priority sequence, such that thermal load peaks are dampened or even completely prevented.

10 Claims, 1 Drawing Sheet

(51) Int. Cl.
  *F27B 3/28* (2006.01)
  *F27D 19/00* (2006.01)
  *F27D 21/00* (2006.01)

(52) U.S. Cl.
  CPC ........ *F27D 21/00* (2013.01); *C21C 2005/5288* (2013.01); *C21C 2300/06* (2013.01); *Y02P 10/216* (2015.11); *Y02P 10/256* (2015.11); *Y02P 10/259* (2015.11); *Y02P 10/286* (2015.11)

(56) References Cited

U.S. PATENT DOCUMENTS

| | | | |
|---|---|---|---|
| 2008/0285615 A1 | 11/2008 | Fink et al. | 373/104 |
| 2008/0307926 A1 | 12/2008 | Matschullat et al. | 75/386 |
| 2010/0315098 A1 | 12/2010 | Fink et al. | 324/613 |
| 2010/0327888 A1 | 12/2010 | Döbbeler et al. | 324/699 |
| 2010/0332160 A1 | 12/2010 | Döbbeler et al. | 702/56 |
| 2011/0007773 A1 | 1/2011 | Döbbeler et al. | 373/60 |
| 2012/0183010 A1 | 7/2012 | Dittmer et al. | 373/104 |

FOREIGN PATENT DOCUMENTS

| | | | |
|---|---|---|---|
| DE | 102005034409 B3 | 5/2006 | C21C 5/52 |
| DE | 102005034378 A1 * | 1/2007 | C21C 5/52 |
| DE | 102008006958 A1 | 8/2009 | F27B 3/28 |
| DE | 102008006965 A1 | 8/2009 | F27B 3/28 |
| DE | 102008006966 A1 | 8/2009 | F27B 3/28 |
| JP | 2008115408 A | 5/2008 | C21C 5/52 |
| SU | 256124 | 11/1970 | H01J 37/30 |
| SU | 1700780 A1 | 12/1991 | H05B 7/148 |
| WO | 2006/131464 A1 | 12/2006 | C21C 5/52 |
| WO | 2007/009924 A1 | 1/2007 | F27B 3/28 |
| WO | 2011/036071 A1 | 3/2011 | H05B 7/148 |

OTHER PUBLICATIONS

German Report of Examination, German Patent Application No. 102009053169.6-24, 6 pages, Sep. 7, 2010.

International PCT Search Repor and Written Opinion, PCT/EP2010/063459, 16 pages, Dec. 3, 2010.

\* cited by examiner

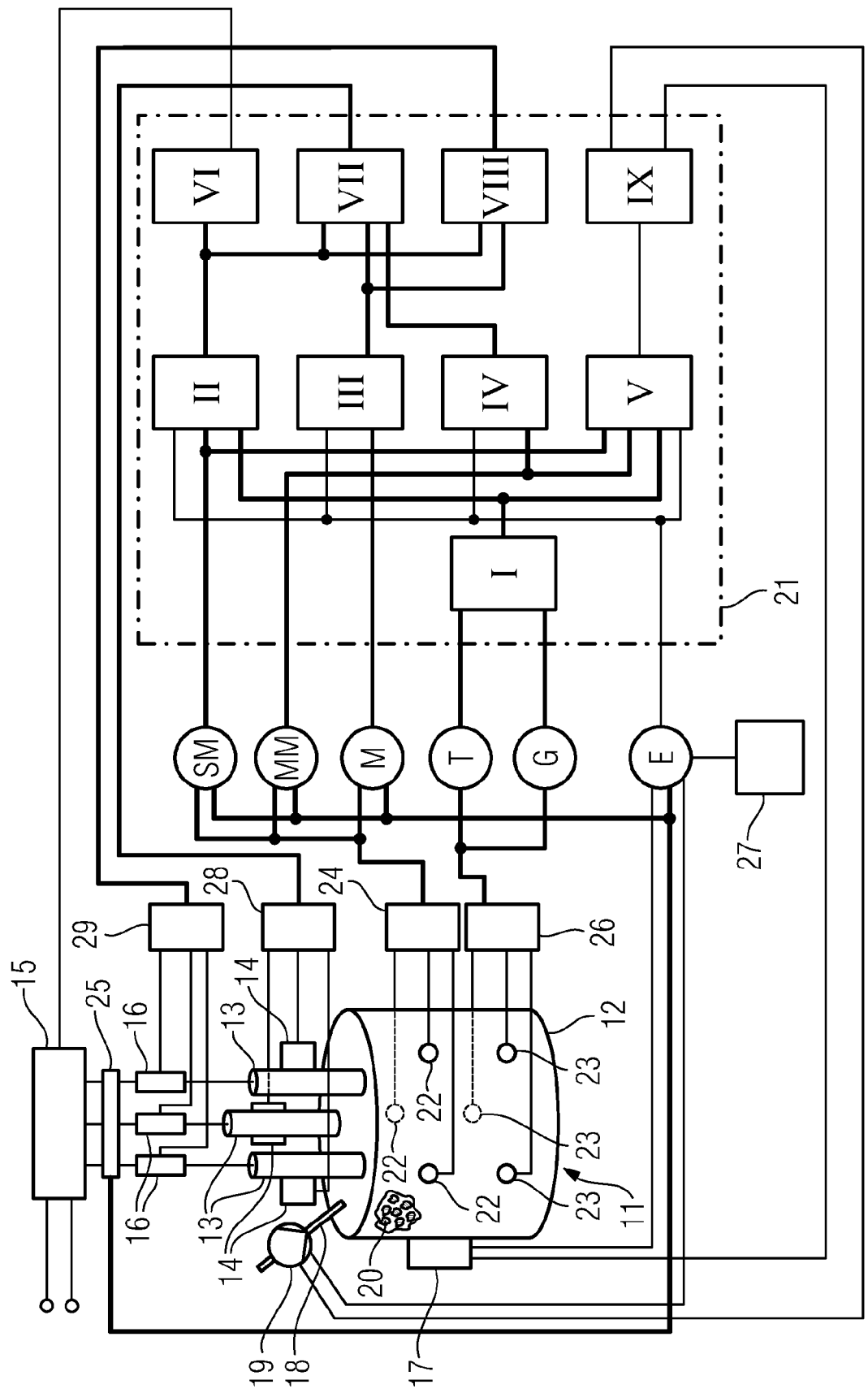

METHOD FOR CONTROLLING A MELT
PROCESS IN AN ARC FURNACE AND
SIGNAL PROCESSING COMPONENT,
PROGRAM CODE AND DATA MEDIUM FOR
PERFORMING SAID METHOD

CROSS-REFERENCE TO RELATED APPLICATIONS

This application is a U.S. National Stage Application of International Application No. PCT/EP2010/063459 filed Sep. 14, 2010, which designates the United States of America, and claims priority to DE Patent Application No. 10 2009 048 660.7 filed Sep. 28, 2009 and DE Patent Application No. 10 2009 053 169.6 filed Nov. 2, 2009. The contents of which are hereby incorporated by reference in their entirety.

TECHNICAL FIELD

This disclosure relates to a method for controlling a melt process in an arc furnace having at least two electrodes, in which at least one type of the following characteristic values for the distribution of melt stock, melt and slag in the furnace fill is produced by evaluating airborne and/or structure-borne sound signals propagating through the interior of a furnace container. The first type of characteristic values represents the shielding of the thermal radiation striking the furnace wall of the furnace container. The second type of characteristic values represents the lumpiness and the melt status (in what follows, only the lumpiness will be mentioned for brevity) of the melt stock in the volume of the furnace fill, particularly in the region below the electrodes. The third type of characteristic values represents the change in the melt stock component located on the furnace wall.

Furthermore, the disclosure also relates to a signal processing device for an arc furnace, having a machine-readable program code, to such a machine-readable program code and to a data medium having such a machine-readable program code, which are suitable for controlling the processes in an arc furnace.

BACKGROUND

The use of sound signals (i.e. structure-borne sound signals generated by at least one electric arc, which are propagated through the melt stock, or airborne sound signals which are propagated through the air volume between the melt stock) to generate various characteristic values is known. In this case sound vibrations are recorded, which can be evaluated by taking into account the current and voltage profiles of the electric arcs of the arc furnace. Sound signals are inherently created in the interior of the furnace fill, since the electric arcs of the arc furnace constitute a sound source.

According to DE 10 2008 006 965 A1, it is known for example that in order to determine a so-called radiation measure (also abbreviated to SM below), structure-borne sound vibrations on the furnace wall are recorded and an associated vibration evaluation signal can be determined from a frequency range of the recorded vibrations. From the recorded electrode current, an associated current evaluation signal can be determined in the same frequency range, which is interpreted as a cause of the vibration generation. The radiation measure is then given in principle as the ratio of the vibration evaluation signal and the current evaluation signal.

According to DE 10 2008 006 966 A1, it is furthermore known that a so-called lumpiness measure (also abbreviated to M below) can be determined by recording the supplied electrode current, determining an rms value measure from the recorded electrode current and furthermore determining an associated current component from the recorded electrode current in a particular frequency range of the recorded electrode current. The lumpiness measure is then given as the ratio of the current component and the rms value measure.

Furthermore, it is known from DE 10 2008 006 958 A1 that a so-called measure of the change in the mass of a melt stock component located on the boundary of the arc furnace (also abbreviated to MM below) can be determined by recording the supplied electrode current, from which a current evaluation signal is obtained in a particular frequency range. The structure-borne sound vibrations are furthermore recorded and a vibration evaluation signal is determined in the particular frequency range. Lastly, the phase shift between the current evaluation signal and the vibration evaluation signal is determined for a multiplicity of common frequencies. From these phase shifts which have been determined, a measure of the change in the mass of the melt stock located on the boundary of the furnace wall can be derived.

With the aforementioned characteristic values, a refined method for controlling the melt process in the arc furnace can be carried out. In order to illustrate this, the melt process taking place in arc furnaces will be explained in more detail below. An arc furnace is used to produce liquid metal, generally steel. The liquid metal is produced from solid melt stock, for instance scrap and/or reduced iron (so-called sponge iron or DRI/HBI) or else with liquid and/or solid pig iron, together with further additives. To this end, energy for melting the melt stock may be introduced into the arc furnace by means of three electrodes, generally in the form of an electric arc between an electrode and the melt stock. So that the melting can take place as efficiently as possible, as far as possible all the energy provided by the electric arc may be introduced into the melt stock. The melt stock is in this case intended to mean the solid to be melted, and molten material is intended to mean liquid metal and/or slag. Melt stock and molten material together make up the furnace fill.

Owing to the predetermined operating procedure in conventional arc furnaces, however, the electric arc may burn free during the melt-in process. This means that the thermal radiation emitted by the electric arc formed between the electrode and the melt stock to a large extent reaches a boundary of the arc furnace, in particular a cooled wall of the arc furnace. This increases the energy consumption of the furnace, on the one hand because the energy of the arc furnace is introduced into the melt stock only to a relatively small extent, and on the other hand more energy is dissipated via the furnace cooling system.

In this context, the idea arises to use the measure MM of the change in the melt stock located on the furnace wall, the lumpiness measure M, the radiation measure SM or similarly suitable characteristic values for the distribution of melt stock, melt and slag in the furnace fill, in order to control the operating procedure of arc furnaces and regulate the electric arc power. The lumpiness measure M may be used in order to regulate the electrode current setpoint value for the electrodes. If, for example, there is comparatively light scrap below an electrode, i.e., a high proportion of air volume in the scrap, then the radiant power may be stepped down in order to prevent the aforementioned free burning of the electric arc due to excessively rapid melting of the light scrap. If an excessively high radiation measure SM is identified on the furnace walls, then the radiant power of the electric arc may be stepped down in order to avoid excessive thermal loading of the furnace walls and a high power loss. If, when determining the shielding measure SM, it is found that a part of the furnace wall is not shielded by melt stock, the radiant power may be stepped down in order to prevent free burning of the electric arc into this free wall section. In this context, the aforementioned signals may be used not only for power reduction but also, in the inverse interpretation, also for power increase. However, since the measures indicated above influence one another, in the case of manual intervention in the running program of the arc furnace it is difficult to estimate how much to intervene in the process.

SUMMARY

In one embodiment, a method is provided for controlling a melt process in an arc furnace having at least two electrodes, in which at least one type of characteristic values for the distribution of melt stock, melt and slag in the furnace fill is produced by evaluating sound signals propagating through the interior of a furnace container, in particular: characteristic values as a measure of thermal radiation striking the furnace wall of the furnace container and/or characteristic values as a measure of the lumpiness of the melt stock in the volume of the furnace fill, particularly in the region below the electrodes and/or characteristic values as a measure of the change in the melt stock component located on the furnace wall, wherein: local characteristic values are generated for the thermal region of influence of each electric arc of the relevant electrode, existing or imminent local thermal load peaks in the regions of influence of the electric arcs are deduced from the local characteristic values, as a priority, the energy distribution between the electric arcs is modified as a function of the characteristic values generated for as long as required so that the thermal load peaks are attenuated or their occurrence is avoided, and secondarily, the thermal power of the electric arcs is reduced as a function of the characteristic values generated by reducing the secondary voltage of a furnace transformer supplying the electrodes and/or by modifying the reactance of an auxiliary reactance connected in series with the electrodes, for as long as required when the effect achieved by the priority change in the energy distribution is not sufficient, or it is predictable that this effect will not be sufficient, in order to reduce or avoid the thermal load peaks.

In a further embodiment, the characteristic values for thermal radiation striking the furnace wall are generated, and these are correlated with a characteristic value for the specific energy introduced per unit mass of melt stock of the last charge since the last charge of melt stock was added. In a further embodiment, local characteristic values for the thermal load on the furnace wall and/or local characteristic values for the gradient of the thermal load are additionally generated for the thermal region of influence of each electric arc, and these characteristic values are correlated with the locally associated characteristic values for thermal radiation striking the furnace wall.

In a further embodiment, the characteristic values for thermal radiation striking the furnace wall are generated and local characteristic values for the thermal load on the furnace wall and/or local characteristic values for the gradient of a change in this thermal load are additionally generated for the thermal region of influence of each electric arc, these characteristic values being correlated with the locally associated characteristic values for thermal radiation striking the furnace wall. In a further embodiment, generated characteristic values for the thermal load on the furnace wall and/or characteristic values for the gradient of a change in this thermal load the thermal power of the electric arcs is reduced by driving a furnace transformer and/or an auxiliary reactance until these characteristic values lie above a critical value for the furnace wall. In a further embodiment, the characteristic values for the lumpiness of the melt stock in the volume of the furnace fill, particularly in the region below the electrodes, are generated, and these are correlated with a characteristic value for the specific energy introduced per unit mass of melt stock of the last charge since the last charge of melt stock was added. In a further embodiment, the characteristic values as a measure of the change in the melt stock component bearing on the furnace wall are generated, and these are correlated with a characteristic value for the specific energy introduced per unit mass of melt stock of the last charge since the last charge of melt stock was added.

In a further embodiment, the thermal power inside the furnace container is additionally increased by chemical reactions by using a burner and/or a lance, the thermal power of the chemical reactions being reduced, as a function of the characteristic values generated, by reducing the supply of fuel to the burner and/or oxygen to the lance for as long as necessary. In a further embodiment, the characteristic values for thermal radiation striking the furnace wall and/or the characteristic values as a measure of the change in the melt stock component bearing on the furnace wall are generated, and these are correlated with a characteristic value for the specific energy introduced per unit mass of melt stock of the last charge since the last charge of melt stock was added. In a further embodiment, local characteristic values for the thermal load on the furnace wall and/or local characteristic values for the gradient of this thermal load are additionally generated for the thermal region of influence of each electric arc, and these characteristic values are correlated with the locally associated characteristic values of claim 9.

In another embodiment, a signal processing device for an arc furnace includes a machine-readable program code which comprises control instructions that cause the signal processing device to carry out any of the methods discussed above.

In another embodiment, a machine-readable program code for a signal processing device for an arc furnace is provided, which program code comprises control instructions that cause the signal processing device to carry out any of the methods discussed above. In another embodiment, a data medium having such a machine-readable program code stored on it is provided.

BRIEF DESCRIPTION OF THE DRAWINGS

FIG. 1 shows a schematic three-dimensional view of an example arc furnace and a block diagram of an example control system connected thereto, according to an example embodiment.

DETAILED DESCRIPTION

Some embodiments improve methods of the type mentioned above in the Background section so that the regulation of the electric arc power is made possible with the least possible energy consumption and the least possible wear on the furnace components. Some embodiments provide a signal processing device causing the method to be carried out, and a data medium and a program code for this.

In some embodiments, local characteristic values are generated for the thermal region of influence of each electric arc. It may be advantageous for the sensors employed to be arranged on the furnace so that the sensors lie opposite the electrodes (electric arc). One advantage of this course of action may be that a more accurate image of the development of the melt process in the arc furnace can be produced, since it proceeds differently at each electrode because of often inhomogeneous scrap fills. Furthermore, in some embodiments, existing or imminent local thermal load peaks in the regions of influence of the electric arcs are deduced from the local characteristic values, even if they have not yet led to a measurable thermal load on the panel at this time. This may be done in the manner described above. For instance, free burning of a particular electric arc is likely when, for example, the wall section of the furnace wall is exposed by the scrap which lies closest to this electric arc melting away. According to some embodiments, this can be determined locally in this wall region by evaluating the shielding characteristic value SM. In this way, it may be advantageously possible to detect very early an event which will not generate a thermal load peak in the region of influence of the relevant electrode, by this electric arc burning free to the exposed wall, until in the future. Since the actual thermal load peak is still pending, its very occurrence can advantageously be prevented.

According to some embodiments, as a priority the energy distribution between the electrodes is firstly modified as a function of the characteristic values generated for as long as required so that the thermal load peaks are attenuated or their occurrence is avoided. In order to illustrate this with reference to the aforementioned example of scrap melting away in a subregion of the furnace wall, the following operating regime may be described. That electric arc which is closest to the relevant wall element, i.e., that electric arc which should be prevented from burning free, must be stepped down, while this requirement does not apply for the other electric arcs. This may be achieved by the setpoint value for the phase impedance of the relevant electric arc being adapted so that the radiant power released to the surroundings by the relevant electric arc decreases and that of the other two electric arcs increases somewhat. In this case, a very rapidly responding controlled variable may be advantageously available, the total thermal power evolved in the arc furnace not initially having to be reduced. Advantageously, therefore, this control regime may be particularly efficient.

Further, according to some embodiments, secondarily the thermal power of the electric arcs is reduced as a function of the characteristic values generated by reducing the secondary voltage of a furnace transformer supplying the electric arcs and/or by increasing the reactance of an auxiliary reactance connected in series with the electric arcs, for as long as required. This measure may be implemented when the effect achieved by the priority change in the energy distribution is not sufficient, or it is predictable that this effect will not be sufficient, in order to reduce or avoid the thermal load peaks.

The voltage supplying the electric arcs may be regulated by varying the output voltage of the furnace transformer, for example by means of on-load tap changers. This is done mechanically by connecting or disconnecting turns of the primary or secondary winding of the furnace transformer (also referred to as a transformer stage). A certain electrical and mechanical stress and therefore wear may be unavoidable in this case, for which reason this measure may advantageously be carried out only when the previously described measures are not sufficient on their own. This may have the advantageous result that the on-load tap changers are switched less often, with positive effects on the maintenance outlay for the furnace transformer. Furthermore, adjustment of the transformer stage in response to the characteristic values generated may be significantly slower than the advantageous regulation of the phase impedances.

The characteristic values MM and M may be employed in a similar way as described above by way of example with reference to the characteristic value SM. The characteristic value M may, for example, be used to determine the lumpiness of the melt stock below the individual electrodes. In this case, it is possible to detect early whether the melt progress below an electrode will take place more rapidly because, for example, there is comparatively light scrap with a high proportion of air volume below this electrode. If, for example, there is a solid heavy scrap component below another electrode, then the electric arc of this electrode will take very much more time to melt the part of the melt stock located there. The electrode below which there is solid scrap cannot advance further into the lower region of the furnace vessel, and the corresponding electric arc will therefore emit disproportionately strong radiation to the boundary of the arc furnace. By influencing the impedance or current setpoint values, the radiation of the relevant electric arc can be reduced. Thus, if an unequal distribution of the lumpiness below the electrodes is identified, then this can be adjusted with respect to the electric arc power evolved by adapting the phase impedances of the phases formed by the electric arcs so that the melt progress is approximately the same below all the electrodes. This means that electrodes below which there is light scrap are set with a higher phase impedance than electrodes below which there is heavy scrap.

The characteristic value MM is a measure of the change in the mass bearing on the furnace wall. If, for example, a strong mass change is detected on a region of the furnace wall, this indicates a possibly imminent scrap collapse. This value is therefore preferably used to predictively cause raising of the possibly affected electrode by increasing the phase impedances. The weighting of this output may be made low or higher according to experience. Optionally, a direct raise command is also predictively applied to the support arm hydraulics, according to the reliability of the prediction.

According to one example embodiment, the characteristic values SM for the radiation measure, the characteristic values M for the lumpiness and the characteristic values MM for the change in the melt stock component on the furnace wall are respectively correlated with a characteristic value E for the energy introduced per unit mass of melt stock (specific energy) of the last charge since this last charge of melt stock was added. Here, it should be noted that the melt stock in the ongoing process is added in charges since the melting of the melt stock (scrap) entails a considerable volume change. The volume released in the upper part of the furnace container is then respectively filled up with new charges of melt stock. After each addition of a charge, the energy introduced into the furnace is determined by measurements and recalculated in terms of the mass of the charge, so that an indicator is obtained concerning how high the proportion of already melted stock in the furnace fill is. Correlation of this characteristic value E with the other characteristic values advantageously makes it possible to interpret the level of the other characteristic values correctly in the context of the melt progress in the arc furnace and implement the correct measures as a function thereof. In the case of an advanced melt process, for example, scrap collapses are very much more likely and the basic thermal load on the melting furnace is already higher.

According to another example embodiment, local characteristic values T for the absolute temperature rise or generally for the thermal load on the furnace wall and/or local characteristic values for the gradient of this temperature rise, or of the thermal load, (characteristic value G) are additionally generated for the thermal region of influence of each electrode, and these characteristic values are correlated with the locally associated characteristic values SM for the radiation measure on the furnace wall. In this context, the idea that the radiation measure on the furnace walls per se does not yet allow sufficient conclusions about critically occurring processes is instrumental. If the furnace is full of scrap, full electric arc radiation is also desirable since the furnace walls are initially protected by the scrap. The melt-in process, however, takes place more rapidly. Toward the end of the melt process, when the temperature on the furnace wall is already elevated, an increase in the radiation measure on the furnace walls must actually be evaluated as more critical. Furthermore, in the event of a large gradient of the thermal load, it is likely that a critical measure of the thermal load will be reached more rapidly and more drastic measures will therefore need to be implemented in order to prevent this. According to another alternative, use of the characteristic values T and/or G may even replace the characteristic value E, so that in this case the latter is not correlated with the characteristic value SM. Depending on the nature of the cooling of the wall elements, the mass flow rates of coolant also need to be taken into account, since in certain cases it is only in this way that deductions can be made concerning the thermal load on the furnace wall.

Furthermore, it may also be advantageous for the thermal power inside the furnace vessel additionally to be increased by chemical reactions by using a burner and/or a lance, the thermal power of the chemical reaction being reduced, as a function of the characteristic values M, MM, SM, E, T and G generated, by reducing the supply of fuel to the burner and/or oxygen to the lance for as long as necessary. Fuels are primarily burnt in the burner, so that chemical energy is supplied to the melt process. In order to accelerate the combustion in the burner or other oxidation processes in the melt stock or in the melt, oxygen may additionally be blown into the interior of the furnace fill by means of so-called lances or coherent burners.

Since both the use of burners and the use of lances in the end lead to additional heating of the furnace fill, it may be particularly advantageous to include these processes as well in the regulation concept. To this end, the characteristic values mentioned above may be employed and evaluated suitably. The regulation of the processes in burners and lances may take place directly in parallel with the priority regulation of the phase impedances and/or secondarily with the regulation of the auxiliary reactance and/or transformer secondary voltage. Advantageously, the melt process can be controlled even better by including burners and lances in the regulation concept.

According to a particular embodiment, the characteristic values SM for thermal radiation striking the furnace wall and/or the characteristic values MM as a measure of the change in the melt stock component bearing on the furnace wall are used for regulating burners and lances. These characteristic values are correlated with the characteristic value E for the thermal energy introduced per unit mass of melt stock of the last charge since the last charge of melt stock was added. The way in which this combination of characteristic values can be evaluated with respect to the thermal load of the arc furnace has already been explained.

According to another embodiment, the characteristic values T for the temperature rise on the furnace wall and/or the local characteristic values G for the gradient of this temperature rise may be used for regulating burners and/or lances, in addition to the characteristic values already mentioned, these characteristic values being correlated with the locally associated characteristic values SM and MM.

Other embodiments provide a signal processing device for an arc furnace having a machine-readable program code, by such a machine-readable program code and by a data medium for such a machine-readable program code, which comprises control instructions that cause the signal processing device to carry out any of the methods disclosed herein. Thus, the methods described herein can advantageously be carried out automatically.

The single FIGURE shows a schematic three-dimensional view of an example arc furnace and a block diagram of an example control system connected thereto, according to an example embodiment. Referring to the FIGURE, an arc furnace 11 comprises a furnace container 12 which is filled with melt stock (scrap) in a manner not represented. Preferably three electrodes 13 project into the furnace container, which can be raised and lowered horizontally along their longitudinal axis by means of actuators 14 (hydraulic or servo motors). The electrodes 13 are supplied with three-phase current via a furnace transformer 15, and each electrode 13 can furthermore be assigned an auxiliary reactance 16 by which electrical power loss can deliberately be generated. Furthermore, a burner 17 is also schematically represented, by which chemical energy can be introduced into the furnace container 12 by burning a fuel. A lance 18 likewise projects into the furnace container 12, and gases can be blown into the furnace container and therefore into the furnace fill by means of a pump 19.

In order for melt stock 20 in the form of metal scrap to be melted in the arc furnace 11, an electric arc is struck on the electrodes 13 so that heat energy is created in the interior of the furnace container.

In this case, as already mentioned, the lance 18 and the burner 17 may additionally be employed in order to achieve input of chemical energy into the furnace container. During the melt process, an automatic regulation process is carried out, which will be explained in more detail below with the aid of the block diagram represented in the FIGURE. The regulation concept according to some embodiments makes use of various input variables, the generation of which is known per se. The regulation concept is highlighted by means of a dot and dash line 21 in the FIGURE. The input variables which are employed in the regulation concept are in detail a characteristic value SM, which gives the measure of thermal radiation striking the furnace wall of the furnace container 12, a characteristic value M as a measure of the lumpiness of the melt stock 20 in the volume of the furnace fill, specifically in the region of the electrodes 13, a characteristic value MM as a measure of the change in the proportion of melt stock 20 bearing on the furnace wall, a characteristic value E for the specific energy introduced per unit mass of melt stock since the last charge of melt stock was added, a characteristic value T for the temperature rise, or generally for the thermal load on the furnace wall, and a characteristic value G for the gradient of this thermal load (for example the temperature rise). These input variables are represented in corresponding circles in the FIGURE, these circles at the same time representing computation units which generate the required input variables from the measurement values (more on this below). It should in general furthermore be noted that signal lines via which only one signal is carried are represented by narrow lines, and signal lines via which a plurality of signals are carried are represented by broad lines. The broad lines may thus optionally be configured as a bundle of a plurality of lines, which are represented merely by the broad line for the sake of clarity. It is, however, also possible to produce these signal lines for example using a data bus. The signals carried in the broad signal lines are groups of signals which are due to the structure of the arc furnace 11 with three electrodes and respectively three further devices to be assigned to the electrodes, such as auxiliary reactances 16, actuators 14 and sensors 22, 23. Because of the electrodes 13 to be driven individually, measurement or control signals respectively travelling in parallel in these lines are necessary.

In detail, the input variables may be generated as follows. For the radiation measure SM, three structure-borne sound sensors 22 are preferably fitted on the furnace walls so that each of the sensors 22 locally measures the sound signals propagating in the interior of the furnace container 12 in the region of influence of one of the three electrodes 13. The signals are combined in a configuration component 24 and are used, by applying the evaluation principle described above with the aid of the profile of the electrode current as a function of time, to generate the radiation measure SM, the lumpiness measure M and the measure MM of the change in the solid material bearing on the furnace wall by means of an evaluation unit 25. Furthermore, the temperature in the cooling elements or a comparable measure for describing the thermal load on the furnace container 12 is measured by means of the sensors 23 in the regions of influence of the electrodes. The sensors 23 deliver their signals to the configuration device 26, the signals for generating the temperature difference T (preferably as a difference from the inlet temperature of the cooling system, and optionally as a temperature difference from an average value formed from these values) and the temperature gradient G being evaluated. The specific energy E introduced per charge is moreover calculated, for which the electrical power of the furnace transformer, by means of the evaluation unit 25, and the thermal power based on the quantitative throughput of oxygen in the lance 18 and the quantitative throughput of fuel in the burner 17 are employed. The data of a memory 27 are also interrogated, which stores the mass of the charges respectively introduced and the time at which these charges were introduced into the furnace container 12 and the wall temperatures existing at this time, for calculating the temperature difference T.

The regulation system according to the exemplary embodiment of the signal processing device as represented is operated with five different controllers I to V and four calculation modules VI to IX. The controllers are preferably embodied as fuzzy controllers. The calculation modules have five outputs, by which the arc furnace and its components are controlled (more on this below). Fuzzy controller I is used to classify the thermal status of the furnace. This controller therefore outputs a value of how critical the thermal status of the furnace currently is. This value is calculated locally for all three regions of thermal influence of the electric arcs (also called hotspots). For each electrode, the temperature profile of the wall elements which bound the regions of influence of the electric arcs 13 is monitored. Critical statuses are determined when either the thermal load T of the relevant wall elements themselves is already very high or a steep rise G in the thermal load is identifiable. In the event of a low thermal load on the wall elements, on the other hand, the status is classed as noncritical. For this purpose, a graduated measure may also be used.

The information of fuzzy controller I is used as an input variable for fuzzy controller II (as well as fuzzy controller V), which quantifies the shielding of the furnace walls by melt stock and in the further course of the method also by foam slag. The radiation measure SM for the thermal zones of influence of the electrodes and the specific energy introduced per basket are used as further input variables. Fuzzy controller II calculates output variables therefrom; these are, respectively, proposed corrections for the transformer stage, as specified by the running program, which are fed into calculation module VI, proposed corrections for the auxiliary reactance which are fed into calculation module VIII, and correction values for the phase impedances of the electric arcs 13, which are fed into calculation module VII. The latter correct the reference value, specified according to the running program, for the phase impedances at the electric arcs, so as to cause redistribution of the energy evolution and the radiant power in the electric arcs, in order to attenuate critical statuses in at least one thermal region of influence of the associated electric arc.

Fuzzy controller III takes into account the status of the melt stock, particularly its change directly below the electrodes (change means primarily the scrap movement and the presence of so-called cold scrap, which sometimes takes place stochastically in the process management of the melt process). The lumpiness measure M and the specific energy E introduced per charge are used as input variables. This therefore involves a total of four input variables. From these, the controller calculates proposed changes for the phase impedances which have an effect on the driving of the electrodes 13 in the manner described above. If, for example, a significant change in the melt stock below one of the electrodes is identified (for example by cold scrap flowing back in), then a proposed value is output that the setpoint value for the phase impedance of this electrode should be reduced. In this way, by means of the actuator 14, the relevant electrode 13 is lowered further into the furnace, so that the electric arc length is shortened and the input of energy into the scrap is increased in comparison with the input of energy by the other two electrodes 13.

Fuzzy controller IV evaluates the change in the mass of the melt stock on the furnace wall, specifically in the regions of thermal influence of the electrodes 13. The measure of the changing mass MM and the specific energy E introduced per charge are used as input variables, i.e. four input signals. As output variables, the controller calculates proposed changes for the setpoint values of the phase impedances in the manner already described. If a significant mass change is detected in a region of the furnace wall, for example, then this indicates a scrap collapse which is possibly imminent or has taken place, with exposure of the wall section. As a precaution, the controller delivers as output signal that the relevant electrode be raised, the phase impedance of this electrode being increased by the electric arc becoming longer.

Fuzzy controller V influences the burner 17 and the lance 18, and therefore controls the input of chemical energy. The measure MM of the change in the solid component on the wall and the radiation measure SM are used as input variables, i.e. six input variables. In addition, the four further input variables of the specific energy E introduced since the last charge and the output variables of fuzzy controller I, i.e. further four input variables, are fed into fuzzy controller V. From these, the fuzzy controller calculates as output variables proposed changes for the input of chemical energy, i.e. proposed changes for the setpoint values of the burner 17 and the lance 18.

All output variables of fuzzy controllers II to V are combined and processed in calculation modules VI to IX. For regulation of the output variables in calculation modules VI, VIII and IX, threshold values for active controller intervention are taken into account, as well as the associated hystereses, the result of which is that regulation oscillations of the regulation system are dampened and regulation of the process taking place in the melt furnace takes place as a priority by redistribution of the energy at the electrodes 13 by increasing or decreasing the required phase impedances. This involves the controlled variable which can be employed most simply without mechanical wear or power loss. Only when these regulation actions are not sufficient to normalize the processes in the arc furnace 11, and therefore the input variables of the regulation system, are the threshold values of the calculation modules VI, VIII and IX exceeded and more drastic regulation actions thus initiated by the regulation system 21. In some embodiments, the interaction of the various fuzzy controllers and calculation modules must be adapted individually for each arc furnace 11, and after adjustment leads to optimized dynamic reaction of the energy input to the change in the current melt-in status of the melt stock.

The working procedure of the modules VI to IX is described in further detail below. Module VI converts the continuous raw values for the transformer stage change into a discrete value. With the aid of the hysteresis, the on-load tap changer of the furnace transformer is prevented from having to be switched too frequently. If, for example, only one of the wall regions is shielded poorly and the rest of the wall regions are shielded well, fuzzy controller II outputs the proposed changes for an asymmetric energy distribution, which is implemented as a priority in module VII. This means that the thermally heavily loaded wall region is relieved by changing the phase impedance of the relevant electrode 13.

Calculation module VI has only one output, which acts on the on-load tap changer of the furnace transformer 15 and by which the output voltage of the latter can be varied.

In calculation module VII, an analytical model of the load distribution is used. In this way, radiation energy can be redistributed in good time from poorly shielded wall parts of the relevant electrodes to other electrodes. In this case, the signals of fuzzy controllers II, III and IV are combined and a suitable redistribution of the setpoint values for the phase impedance of the individual electrodes is calculated therefrom. To this end, the influence of fuzzy controllers II, III and IV may be taken into account in a weighted fashion depending on the conditions of the arc furnace 11 and the resulting effect of the change in the determined measures. One particularly simple possibility is to average all the signal outputs of fuzzy controllers II, III and IV, in which case the respectively averaged signals of each electrode are of course evaluated individually. The output signals of calculation module VII act directly on a control system 28, which is provided for the actuators 14 and can drive them individually.

By means of calculation module VIII, the auxiliary reactances can be driven if this becomes necessary (secondary regulation). For this purpose, a control system 29 is driven by the calculation module VIII, the control system 29 driving the auxiliary reactances 16, one of which is provided per electrode 13. In this way, the power of the electric arcs 13 can be reduced directly by electrical power being spent in the form of reactive power in the auxiliary reactance 16.

Lastly, calculation module IX contains a program by means of which the lance 18 and the burner 17 can be driven (of course, it is also possible for a plurality of burners or lances to be locally driven). As a function of the value output by fuzzy controller V, the chemical thermal power introduced can thereby be stepped down or increased. Further influencing variables, which are not presented in detail and are based on the chemical requirements in the arc furnace, may also play a part in this.

What is claimed is:

1. A method for controlling a melt process in an arc furnace having at least two electrodes, in which sound signals propagating through an interior of a furnace container are evaluated to produce at least one type of characteristic values for a distribution of melt stock, melt and slag in a furnace fill, the characteristic values comprising one of characteristic values as a measure of thermal radiation striking a furnace wall of the furnace container, characteristic values as a measure of a lumpiness of a melt stock in the volume of the furnace fill, and characteristic values as a measure of the change in a melt stock component located on the furnace wall, the method comprising:
generating characteristic values as a measure of thermal radiation striking the furnace wall of the furnace container by generating local characteristic values for a thermal region of influence of each electric arc of the relevant electrode, and
deducing local thermal load peaks in the regions of influence of electric arcs based on the local characteristic values,
modifying an energy distribution between the electric arcs as a function of the local characteristic values generated for as long as required so that thermal load peaks are attenuated or their occurrence is avoided, and
reducing thermal power of the electric arcs as a function of the generated characteristic values for as long as required when it is determined or predicted that the effect achieved by the energy distribution modification is not sufficient to reduce or avoid thermal load peaks, wherein the thermal power of the electric arcs is reduced by at least one of (a) reducing a secondary voltage of a furnace transformer supplying the electrodes and (b) modifying a reactance of an auxiliary reactance connected in series with the electrodes, and
generating a characteristic value for the specific energy introduced per unit mass of melt stock of the last charge since the last charge of melt stock was added; and
correlating the characteristic values as a measure of thermal radiation striking the furnace wall with the characteristic value for the specific energy introduced per unit mass of melt stock of the last charge since the last charge of melt stock was added.

2. The method of claim 1, further comprising:
increasing thermal power inside the furnace container by chemical reactions by using a burner and/or a lance, and
reducing the thermal power of the chemical reactions, as a function of the characteristic values generated, by reducing the supply of fuel to the burner and/or oxygen to the lance.

3. The method of claim 2, further comprising:
generating characteristic values for thermal radiation striking the furnace wall and/or the characteristic values as a measure of the change in the melt stock component bearing on the furnace wall, and
correlating the characteristic values for thermal radiation striking the furnace wall and/or the characteristic values as a measure of the change in the melt stock component bearing on the furnace wall with a characteristic value for the specific energy introduced per unit mass of melt stock of the last charge since the last charge of melt stock was added.

4. The method of claim 3, further comprising:
generating local characteristic values for thermal load on the furnace wall and/or local characteristic values for a gradient of this thermal load for the thermal region of influence of each electric arc, and
correlating the local characteristic values for a thermal load on the furnace wall and/or local characteristic values for a gradient of this thermal load for the thermal region of influence of each electric arc with the locally associated characteristic values for thermal radiation striking the furnace wall and/or the characteristic values as a measure of the change in the melt stock component bearing on the furnace wall.

5. The method of claim 1, further comprising:
generating local characteristic values for the thermal load on the furnace wall, and
correlating the local characteristic values for the thermal load on the furnace wall with locally associated characteristic values for thermal radiation striking the furnace wall.

6. The method of claim 1, further comprising:
generating characteristic values for thermal radiation striking the furnace wall and local characteristic values for a thermal load on the furnace wall and/or local characteristic values for a gradient of a change in this thermal load for the thermal region of influence of each electric arc, and
correlating the characteristic values for thermal radiation striking the furnace wall and local characteristic values for the thermal load on the furnace wall and/or local characteristic values for the gradient of a change in this thermal load with the locally associated characteristic values for thermal radiation striking the furnace wall.

7. The method of claim 1, further comprising:
generating characteristic values for a thermal load on the furnace wall and/or characteristic values for a gradient of a change in this thermal load; and
reducing the thermal power of the electric arcs by driving a furnace transformer and/or an auxiliary reactance until these characteristic values lie above a critical value for the furnace wall.

8. The method of claim 1, further comprising:
generating characteristic values for a lumpiness of the melt stock in the volume of the furnace fill, and
correlating the characteristic values for the lumpiness of the melt stock in the volume of the furnace fill with a characteristic value for the specific energy introduced per unit mass of melt stock of the last charge since the last charge of melt stock was added.

9. The method of claim 1, further comprising:
generating characteristic values as a measure of the change in the melt stock component bearing on the furnace wall, and
correlating the characteristic values as a measure of the change in the melt stock component bearing on the furnace wall with a characteristic value for the specific energy introduced per unit mass of melt stock of the last charge since the last charge of melt stock was added.

10. The method of claim 1, further comprising:
generating local characteristic values for the gradient of the thermal load for the thermal region of influence of each electric arc, and
correlating the local characteristic values for the gradient of the thermal load for the thermal region of influence of each electric arc with locally associated characteristic values for thermal radiation striking the furnace wall.

\* \* \* \* \*